US009965567B2

(12) United States Patent
Christolini et al.

(10) Patent No.: US 9,965,567 B2
(45) Date of Patent: May 8, 2018

(54) ADAPTIVE CONTENT MANAGEMENT SYSTEM FOR MULTIPLE PLATFORMS

(71) Applicant: CBS Interactive Inc., San Francisco, CA (US)

(72) Inventors: Charles Christolini, San Francisco, CA (US); Peter Yared, San Francisco, CA (US); Trent Ruane, Oakland, CA (US)

(73) Assignee: CBS INTERACTIVE INC., San Francisco, CA (US)

( * ) Notice: Subject to any disclaimer, the term of this patent is extended or adjusted under 35 U.S.C. 154(b) by 383 days.

(21) Appl. No.: 14/255,585

(22) Filed: Apr. 17, 2014

(65) Prior Publication Data

US 2015/0248423 A1    Sep. 3, 2015

Related U.S. Application Data

(60) Provisional application No. 61/946,566, filed on Feb. 28, 2014.

(51) Int. Cl.
| | |
|---|---|
| *G06F 17/00* | (2006.01) |
| *G06F 17/30* | (2006.01) |
| *G06F 17/24* | (2006.01) |
| *G06F 17/21* | (2006.01) |

(52) U.S. Cl.
CPC ........ *G06F 17/3089* (2013.01); *G06F 17/212* (2013.01); *G06F 17/248* (2013.01)

(58) Field of Classification Search
CPC ........................... G06F 17/3089; G06F 17/217
USPC ........................................ 715/243, 246, 253
See application file for complete search history.

(56) References Cited

U.S. PATENT DOCUMENTS

| | | | | |
|---|---|---|---|---|
| 7,287,218 | B1* | 10/2007 | Knotz | G06Q 10/10 715/209 |
| 8,176,120 | B2* | 5/2012 | Rosenstein | G06F 17/24 709/203 |
| 8,732,581 | B2* | 5/2014 | Poling | G06F 17/2205 715/204 |
| 8,862,986 | B2* | 10/2014 | Atkins | G06F 9/4443 715/243 |
| 2002/0143822 | A1* | 10/2002 | Brid | G06F 17/30905 |
| 2005/0171947 | A1* | 8/2005 | Gautestad | G06F 17/3089 |

(Continued)

*Primary Examiner* — Stephen Hong
*Assistant Examiner* — Matthew Ludwig
(74) *Attorney, Agent, or Firm* — Rimon, P.C.; Marc Kaufman

(57) ABSTRACT

A content management system generates views of digital content for presentation on a user client. The content management system includes different publication templates having different layouts for presenting content on different types of viewing devices. The publication template is based on a layout, which specifies a spatial arrangement of sections. The publication template associates publication elements such as a leading article with sections of a layout. A view matches components such as an article with sections of a publication template based on a mapping between the components and publication elements associated with the sections. The content management system generates different views for different types of viewing devices. The content management system also analyzes interactions between user clients, components, and views, and the content management system includes an analytics interface to present data about these interactions.

24 Claims, 5 Drawing Sheets

(56) References Cited

U.S. PATENT DOCUMENTS

| | | | | |
|---|---|---|---|---|
| 2009/0094327 A1* | 4/2009 | Shuster | ............... | G06F 17/2235 |
| | | | | 709/203 |
| 2014/0351268 A1* | 11/2014 | Weskamp | ............. | G06F 17/217 |
| | | | | 707/748 |
| 2015/0026594 A1* | 1/2015 | Dave | ..................... | H04L 65/403 |
| | | | | 715/753 |
| 2015/0113386 A1* | 4/2015 | Wu | ..................... | G06F 17/2229 |
| | | | | 715/243 |
| 2015/0135058 A1* | 5/2015 | Metcalf | ............... | G06F 17/2247 |
| | | | | 715/234 |

\* cited by examiner

ADAPTIVE CONTENT MANAGEMENT SYSTEM FOR MULTIPLE PLATFORMS

CROSS-REFERENCE TO RELATED APPLICATION

This application claims the benefit of U.S. Provisional Application No. 61/946,566, filed Feb. 28, 2014, which is incorporated by reference in its entirety.

BACKGROUND

1. Field of Art

The disclosure generally relates to the field of digital media, and more particularly to the field of content distribution.

2. Description of the Related Art

In conventional content publishing systems, publishers of digital media generally structure user interfaces for a specific type of display platform. For digital content intended for viewing on a laptop or a personal computer, the digital media publisher may create a webpage that is adapted for viewing on a relatively large display and that assumes a user will interact with a pointing device (e.g., a mouse, a touchpad) and an alphanumeric keyboard. For digital content intended for viewing on a mobile device, the digital publisher creates a user interface adapted for viewing on a relatively small display with narrow width relative to its height. The interface may assume that primary user interaction will occur through a touch-sensitive display rather than through a separate alphanumeric keyboard. For digital content intended for viewing on a tablet, the digital publisher creates an interface that is adapted for a larger display but that assumes a touch-sensitive display.

To support viewing digital media on different devices, a digital media publisher can create and maintain separate user interfaces specific to a display platform such as, for example, a PC (personal computer) user interface, a mobile user interface, and a tablet user interface. However, the labor requirements for maintaining separate device-specific user interfaces can be burdensome, particularly when the content is updated frequently. Alternatively, a digital publisher may create one or more generic user interfaces designed for viewing across multiple display platforms. Such a strategy eliminates duplicate labor from updating user interfaces specific to various display platforms. A generic user interface, however, does not account for the differing display and input characteristics of different display platforms, so the generic user interface degrades the user experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
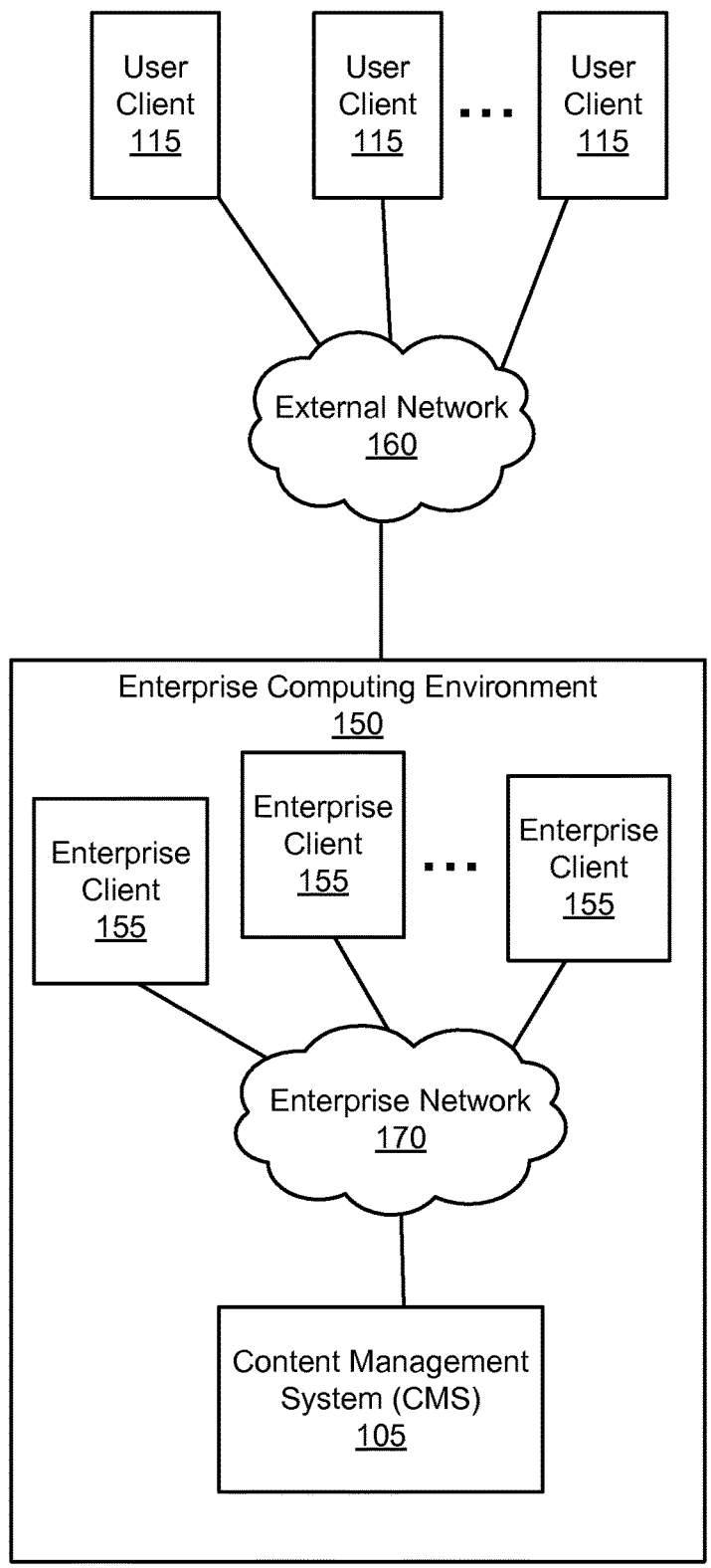
FIG. 1A illustrates a digital publishing environment, according to one embodiment.

The Figures (FIGS.) and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A content management system generates a view of digital content in a digital publication through a computer-implemented method or according to instructions on a computer-readable storage medium. A plurality of components is stored for inclusion in a digital publication. Each of the plurality of components comprises one or more digital content items. A first publication template associated with a first type of viewing client is stored. This first publication template specifies a first layout for arranging elements of the digital publication when viewed on the first type of viewing client, and the first publication template specifies an association between a plurality of publication elements and sections of the first layout. A second publication template associated with a second type of viewing client is stored. This second publication template specifies a second layout for arranging elements of the digital publication when viewed on the second type of viewing client, and the second publication template specifies an association between a plurality of publication elements and sections of the second layout.

The content management system obtains a mapping between each of the plurality of publication elements and one or more of the plurality of stored components. A first view of the digital publication is generated by one or more processors based on the first publication template and the mapping. The first view includes the one or more of the plurality of stored components arranged in the first layout as specified by the first publication template. A second view of the digital publication is generated by one or more processors based on the second publication template and the mapping. The second view includes the one or more of the plurality of stored components arranged in the second layout as specified by the second publication template. The content management system receives a content request from a user client and sends the user client a first view responsive to the user client being the first type of viewing device. The content management system sends the user client a second view responsive to the user client being the second type of viewing device.

Digital Publishing Environment

FIG. 1 illustrates a digital publishing environment, according to one embodiment. The digital publishing environment includes an enterprise computing environment 150, an external network 160 (e.g., the Internet) and one or more user clients 115. The enterprise computing environment 150 includes one or more enterprise clients 155, a content management system (CMS) 105, and an enterprise network 170. Although one instance of the external network 160 and enterprise network 170 are shown, multiple networks may be present. Furthermore, although only three user clients 115 and enterprise clients 155 are shown, any number of these devices may be present.

The user client 115 displays digital content generated by the CMS 105 for viewing by one or more users. User clients 115 are generally any device capable of receiving and presenting digital content. Example user clients 115 include display platforms such as a computer (e.g., a personal computer, a laptop, a smart television), a tablet (e.g., a touch-screen device), and a mobile device (e.g., a cell phone, a smart phone, a personal digital assistant, a smart watch, an eye-mounted device, or a head-mounted device). Other example device types include a public display such as a billboard or a news ticker. Different clients may be associated with different device types (e.g., PC, mobile, or tablet), based on the hardware components of the display platform (e.g., the display size, the display aspect ratio, associated user input devices) as well as the software components of the display platform (e.g., operating system, browser program). The enterprise clients 155 can similarly include any computing device or display platform capable of interfacing with the CMS 105 via the enterprise network 170.

The CMS 105 is implemented, for example, as one or more servers operating in the enterprise computing environment 150. The CMS 105 enables enterprise users to generate, edit, and manage digital publications via an enterprise client 155 as described above. Example digital publications may have subject matter including news, sports, science, technology, videogames, music, song lyrics, movies, and television. An embodiment of a CMS 105 is described in further detail below.

The enterprise network 170 and external network 160 enable communications among the entities connected to them through one or more local-area networks and/or wide-area networks. In one embodiment, the external network 160 (and/or the enterprise network 170) is the Internet and uses standard wired and/or wireless communications technologies and/or protocols. The networks 170, 160 can include links using technologies such as Ethernet, 802.11, world-wide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the networks 170, 160 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The data exchanged over the networks 170, 160 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above. Although illustrated separately, the external network 160 and the enterprise network 170 may be sub-networks of the same network.

The enterprise computing environment 150 generates digital publications available to the user clients 115 via the external network 160. For example, the enterprise computing environment 150 may comprise a computing environment in a news, sports, or media publishing enterprise. The content produced by the enterprise computing environment 150 may be in the form of, for example, a web site, a mobile application user interface, a tablet application user interface, a smart television application user interface, or other electronic user interface. The enterprise computing environment 150 enables members of the enterprise (e.g., writers, publishers, editors, etc.) to easily and efficiently generate, edit, update, and/or publish content suitable for viewing on a plurality of different types of user clients 115 (e.g., PCs, tablets, mobile devices, etc.). Furthermore, the enterprise computing environment 150 enables members of the enterprise to view various statistics, reports, or other information related to viewership of the digital publications, and to tailor the published content based on this feedback.

To generate digital content for publication, the enterprise clients 155 may be used by writers or other content providers to generate digital content and submit the digital content to the CMS 105 for inclusion in a digital publication. Digital content includes, for example, text, images, animations, videos, digital audio files, captions, song lyrics, subtitles, an advertisement, or a combination of different content types. Other example of digital content includes social media content (e.g., a post, a status update, a comment, shared digital content, digital content posted in a social network) or a collection thereof. Digital content may also include references (e.g., a link or an address) to other digital content. Digital content may also include collections of digital content.

In one embodiment, a content provider submits digital content to the CMS 105 as a component that can be used in a digital publication. Each component includes one or more predefined attributes or fields that each specifies one or more digital content objects associated with the component and/or metadata associated with the component. For example, an article component may include attributes specifying the main text associated with the article, one or more images associated with the article, one or more videos associated with the article, a title, a headline, a sub-headline, one or more authors, a summary, a hyperlink, summary text, an animation, a video preview, and/or a timestamp. A component may also comprise an individual digital content object such as a video or image. By submitting content in the form of components having content and metadata organized into predefined attributes, the CMS 105 can efficiently process components for inclusion in publications as described further below. Other example components include a photo gallery, a video playlist, an audio playlist, a collection of articles, a podcast, a blog entry, a review, a poll, or a "carousel." A "carousel" publication component contains a set of components (e.g., article components) and displays different components from the set over time or in response to user selections to navigate through the carousel publication component.

The CMS 105 stores the components and enables editors to access the stored content via an enterprise client 155 to edit, delete, or update the content. Furthermore, the digital content may be accessed by publishers to compile digital content into a digital publication that will be accessible to the user clients 115. The enterprise clients 155 may furthermore access various reports produced by the CMS 105 related to viewership of the published content, which may provide useful feedback to guide decisions related to publishing components.

Content Management System Architecture

Figure 1B:
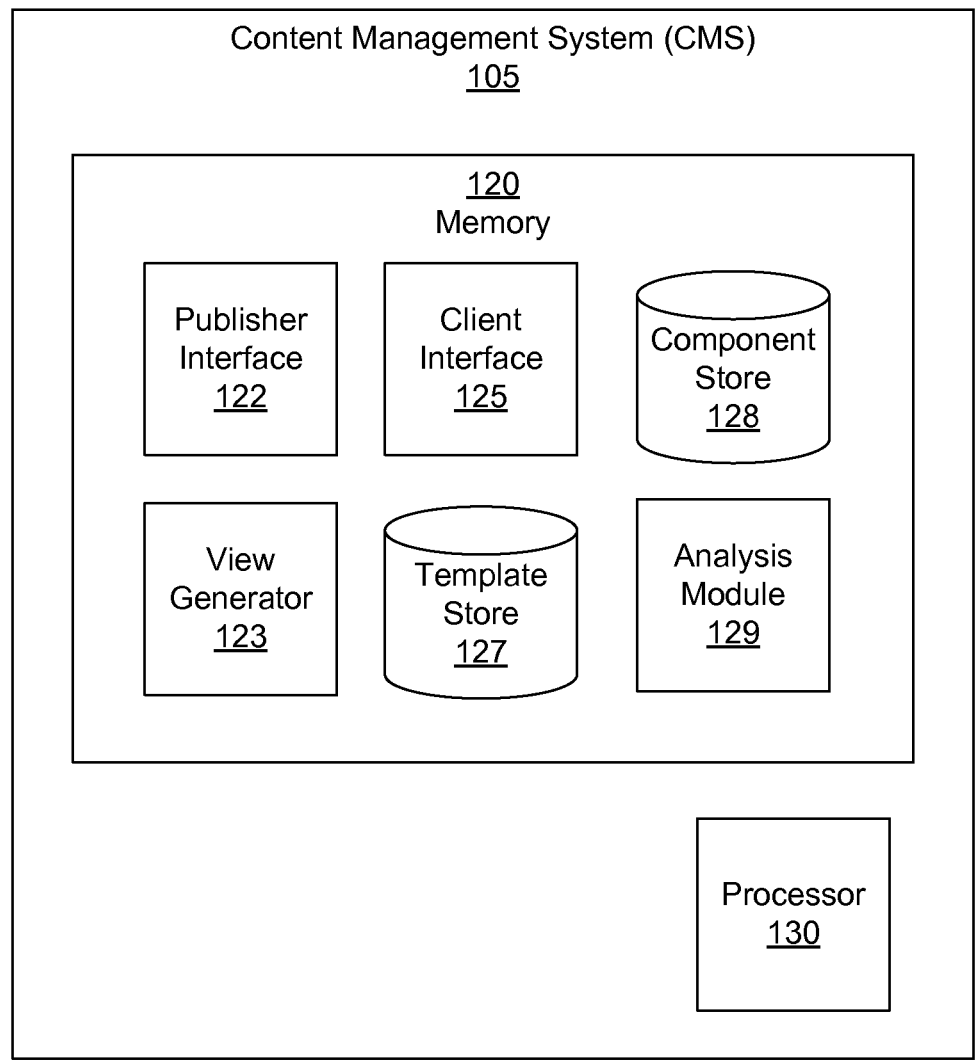
FIG. 1B illustrates a content management system, according to one embodiment.

FIG. 1B illustrates an example embodiment of a CMS 105 in more detail. The CMS 105 may be embodied, for example, as one or more servers operating in an enterprise computing environment 150. In the illustrated embodiment, the CMS 105 includes a memory 120 and one or more processors 130. The memory 120 includes modules such as a publisher interface 122, a view generator 123, a user interface 125, a publication template store 127, a component store 128, and an analysis module 129. One configuration of modules is shown, consistent with one embodiment, but alternative embodiments may contain fewer, additional, or different modules configured to perform similar functionality. The modules may be embodied as instructions stored to a non-transitory computer-readable storage medium such as the memory 120. The instructions when executed by the processor 130 carry out the attributed functionality of the modules as described herein.

The publisher interface 122 is structured for creating, viewing, and editing publication templates and layouts for displaying components in a digital publication, and for creating publications based on the layouts and publication templates. A layout defines a spatial arrangement of different sections of a digital publication. For example, a layout may specify the width, height, and spatial location of different sections of a publication in which digital content may be displayed. A layout may be used to create a publication template. A publication template defines an association between a publication element specifying a component type (or a content type) and one or more sections of a layout. For example, for a given layout specifying sections A, B, C, and D and their respective size and spatial positions, a publication template may be created to indicate that section D should be associated with an "advertisement" publication element and sections A, B, and C are associated with different attributes of a "featured article" publication element with section A displaying a headline for the featured article, section B displaying the text of a featured article, and section C displaying an image associated with the featured article. Different layouts and publication templates may be created for different display platforms to display publication elements differently. For example, a publication template for a mobile platform may specify a smaller section for displaying an image publication element than a publication template for a tablet. Furthermore, a publication element present in one publication template is not necessarily present in publication templates for other display platforms, and attributes used for a particular publication element in one publication template may not be displayed in another publication template. For example, a sub-heading for a featured article may be displayed in a publication template for a PC platform, but the sub-heading may be omitted in a publication template for a mobile platform.

The publisher interface 122 is furthermore structured to enable a publisher to create a publication from a publication template by selecting components (or attributes of components) to associate with different publication elements of the publication template. The mapping of a selected component to a publication element is stored as a "view" in which each section of a layout becomes associated with a pointer to a particular component (or attribute of a component) in the component store 128. For example, a publisher may select a particular article from the available components to assign to the "featured article" publication element. Then, the publisher interface 122 automatically populates the layout by placing the appropriate attributes of the selected articles in the appropriate sections, as specified by the publication template. In another example, a publisher may select a component comprising a video about groundhog day to assign to a "video of the day" publication element of a publication template. A video title attribute of the component indicates that the video's title is "Large Squirrel Predicts Weather" and this title is therefore automatically placed in the section associated with the "video title" attribute of the publication element. Furthermore, a preview image (e.g., "Punxsutawney Phil") of the video may be automatically placed in a section assigned to a "preview image" attribute of the publication element.

Alternatively or additionally, the publication interface 122 includes tools to automatically match a component (or attribute of a component) with a publication element according to one or more rules. For example, a component may be automatically assigned to a publication element, such as a "featured article" based on a ranking according to popularity (e.g., views, clicks, shares, comments, social media interactions) or by time priority (e.g., recent digital content, recent comments, recent social media interactions). The tools to match a component with a publication element of a publication template according to one or more rules may include content filters (e.g., components are selected from a category of content or components are selected from a publisher-defined group of components). The tools may match components to one or more publication elements of a publication template based on an externally curated source of content (e.g., an external news service, a feed from a social networking service). In one embodiment, the publisher interface 125 includes functionality for multiple publishers to edit a publication template through different enterprise clients 155. For example, a publisher may "lock" a component of the template when configuring options associated with the component or matching a publication element with a component.

A publication may have multiple views, with each view corresponding to a different publication template for a different intended display platform (e.g., PC, mobile, or tablet). Assigning a component to a publication element in one view may automatically cause the component to be assigned to a corresponding publication element in a different view. For example, when a publisher assigns an article to a "featured article" publication element, the CMS 105 will automatically populate the layouts for the different platforms based on the different publication templates. In some cases, different attributes of the component may be used in different publication templates. For example, in the PC view, the publication template may specify that a sub-heading attribute of an article is displayed, while in a mobile platform view, the publication template may lack the sub-heading. Furthermore, the same attributes may be assigned to different spatial locations in the different views or may be displayed differently (e.g., different font size, or color) based on the rules associated with the publication template. Beneficially, once the publication templates are created, a publisher can simply map each publication element to a specific component and the CMS 105 can then automatically generate views for different platforms that are optimized for the different platforms based on the predefined publication templates. In one embodiment, the CMS 105 supports creation of different publication editions associated with different locales (e.g., a city, a region, a state, one or more countries) and/or different languages. Each publication edition is associated with views for different user clients 115.

The view generator 123 creates views based on publication templates created through a publisher interface 122 and mapping information. In one embodiment, the view generator 123 creates views based on a graphical user interface that enables a publisher to view a graphical representation of the publication template, and then select sections of the layout to indicate a component or attribute of a component to associate with that section in accordance with the publication template rules. In this case, a view may first be created using a "master publication template," and the CMS 105 then generates one or more derived views using publication templates associated with other display platforms. Typically, the PC publication template includes all of the publication elements present in the tablet and mobile publication templates. Thus, in one embodiment, the PC publication template is used as a "master publication template." In other embodiments, a publication template for a different platform may be used as a "master publication template" or the master publication template may be a generic publication template that includes all of the publication elements present in any of the platform-specific publication templates. Once the master publication template is populated to link each publication element to a specific component, the view generator 123 infers the mapping between publication elements and components. To generate the remaining views, the view generator 123 uses the inferred mapping and the publication templates for other platforms to generate views for other display platforms. As described above, if a component is assigned to a publication element of the master publication template that is not present in a publication template, then that component (or component attribute) is not included in the publication template.

In another embodiment, the view generator 123 creates views without a "master publication template." Here, the view generator 123 receives a mapping between components and publication elements without necessarily using a publication template-based graphical interface. The mapping may be input manually (e.g., by a publisher on an enterprise client 155) using drop down menus or other user interface elements. Alternatively or additionally, the mapping may be generated according to one or more rules by a module that automates selection of components to fill publication elements in the publication templates. In one embodiment, the mapping specified by the publication templates may be manually overridden. For example, a publisher may (through an enterprise client 155) manually change the title attribute to one that does not necessarily correspond to the title attribute of the selected component. Furthermore, the publisher may manually override the publication template to display a different title in different views.

The client interface 125 is structured to output a digital publication to a user of a user client 115 via the external network 160. For example, the client interface 125 detects the locale and/or language associated with a user client 115 (e.g., based on a top-level domain associated with the request, based on a location of the Internet Protocol (IP) address associated with the user client 115) and selects a publication edition corresponding to that locale and/or language. The client interface 125 determines the type of client requesting the publication, determines the appropriate view (e.g., PC, mobile, or tablet) based on the type of user client 115 and/or the publication edition, and selects the appropriate view. In one embodiment, the client interface 125 records user interactions with digital content. Interactions include direct interactions (e.g., a user selection or "click" on digital content or on a component, a share via email, a comment on a component, a command to a video or audio player associated with a component, or a rating of a component) and indirect interactions indicative of user attention to a component (e.g., a cursor hovering over a content item). Interactions may also include views of a digital publication or a component thereof. The client interface 125 reports interactions to the analysis module 129.

In one embodiment, the publication template store 127 stores the publication templates for the different platforms, such as, for example, one or more computer publication templates, one or more mobile device publication templates, or one or more tablet publication templates. In one embodiment, different publication templates are defined for different device types. Alternatively or additionally, different layouts are defined for different operating systems (e.g., Windows®, iOS®, Android™) and/or for different browsers (e.g., Chrome™, Safari®, Internet Explorer®).

The component store 128 includes one or more components. Components may be created within the enterprise computing environment 150 (e.g., by an author using an enterprise client 155). Components may be received from external sources such as an advertisement from an advertiser or user-generated content from a user client 115 (e.g., social media content). A component may be used by the publisher interface 122 or the view generator 123 as described above.

The analysis module 129 analyzes user interactions with digital content presented through the client interface 125. For example, the analysis module 129 may track views, click-throughs, or other web analytics associated with viewing of the digital publications. The analysis module 129 may aggregate interactions recorded by the client interface 125 with components for purposes of ranking content item popularity. For example, the analysis module 129 determines popularity of components according to total selections of each component. As another example, the analysis module 129 ranks components based on a proportion of users who have opted to play a video associated with a component relative to the total users who have viewed the component. In one embodiment, the analysis module 129 aggregates indirect user interactions to determine visually appealing attributes or components. For example, the analysis module 129 produces a color-coded heat overlay of a view based on cursor movement and/or location of clicks or gestures to select a component. Aggregations of user interactions may be displayed through an analytics interface viewable through an enterprise client 155.

In one embodiment, the analysis module 129 instructs the view generator 123 to perform alternative component testing (e.g., A/B testing). In alternative component testing, two or more alternative components are mapped to a publication element to create an alternative view for each alternative component. Different user clients 115 that request a view may be presented with different alternative views. In one embodiment, different alternative views are matched to different user clients 115 based on randomization or based on a targeting approach (e.g., based on the apparent geographic location of the user client request 115). For example, a majority (e.g., 90%) of user clients 115 are randomly served a view with a Shaun White article component mapped to the leading article publication element and the remaining user clients 115 (e.g., 10%) are served a view featuring a Bode Miller article component mapped to the leading article publication element. Various alternative component tests may include mapping different alternative components to more than one publication element. The alternative component testing enables publishers to test viewer statistics related to different versions of the publication to determine which articles or combinations of articles are most popular or more likely to increase viewership.

In one embodiment, the analysis module 129 analyzes user clients 115 that receive different alternative views. An analysis interface available through the enterprise client 155 provides a graphical interface that indicates interaction aggregations for the different alternative views. For example, the analysis interface includes overlays to a publication element that graphically indicate interactions with different alternative components served as part of an alternative component test. In this interface, the graphical interface may include a representation of the publication template or a particular view of a digital publication and overlay text or numerical data over various elements to illustrate the analytical data associated with each component. The analysis interface may be used to select components and publication elements for inclusion in an alternative component test as well as configure testing parameters. For example, the analysis interface includes a slider used to control the proportion of user clients 115 that receive different views that have different alternative components. Beneficially, a publisher may use the displayed interaction data to increase the proportion of user clients 115 that receive more popular components as determined from an alternative component test.

In one embodiment, the analysis module 129 automatically modifies the mapping of components to publication elements based on interaction data received through the client interface 125. For example, the analysis module 129 selects the most popular story within each of several categories (based on interaction data) for mapping to several publication elements corresponding to the categories. Based on interaction totals, the analysis module 129 may modify the proportion of user clients 115 that receive a component as part of an alternative component test. For example, in one embodiment, the analysis module 129 may run an alternative component test for a predefined amount of time, and at the end of the time period, select the version of the publication that is is most popular based on the collected statistics. Alternatively or additionally, the analysis module 129 gradually increases the proportion of user clients 115 that receive a story that appears to be more popular (e.g., more interactions with a component relative to the number of user clients 115 served the component). In one embodiment, the analysis module 129 automatically initiates and configures alternative component tests. For example, when a new component is published, a small proportion of user clients 115 are served alternative views with the new component in place of a similar component selected by a publisher. In one embodiment, the analysis module 129 determines relative performance between views created by a publisher and views created according to one or more computer-implemented rules. Hence, the analysis module 129 provides publishers with feedback about views and components through an analysis interface and provides functionality for alternative component tests.

The processor 130 may be any general-purpose processor (e.g., a central processing unit (CPU), a graphics processing unit (GPU), a digital signal processor (DSP), one or more application specific integrated circuits (ASICs), one or more radio-frequency integrated circuits (RFICs), or any combination of these). The processor 130 is configurable to execute instructions corresponding to the processes described herein.

The memory 120 may be, for example, firmware, read-only memory (ROM), non-volatile random access memory (NVRAM), and/or RAM. The memory 120 can include a storage device such as a hard disk drive or any other device capable of storing data, including a writeable compact disk (CD), or a solid-state memory device. The memory 120 is configured to store instructions and data that can be executed by the processor 130. The instructions (e.g., software or program code) may also reside, completely or at least partially, within the memory 120 or within the processor 130 (e.g., within a processor's cache memory) during execution thereof. The memory 120 may include any machine-readable medium. The term "machine-readable medium" should be taken to include a single medium or multiple media (e.g., a centralized or distributed database, or associated caches and servers) able to store computer-readable instructions (or software or program code). The term "machine-readable medium" includes, without limitation, data repositories in the form of solid-state memories, optical media, and magnetic media.

Layouts for Different Device Types

Figure 2A:
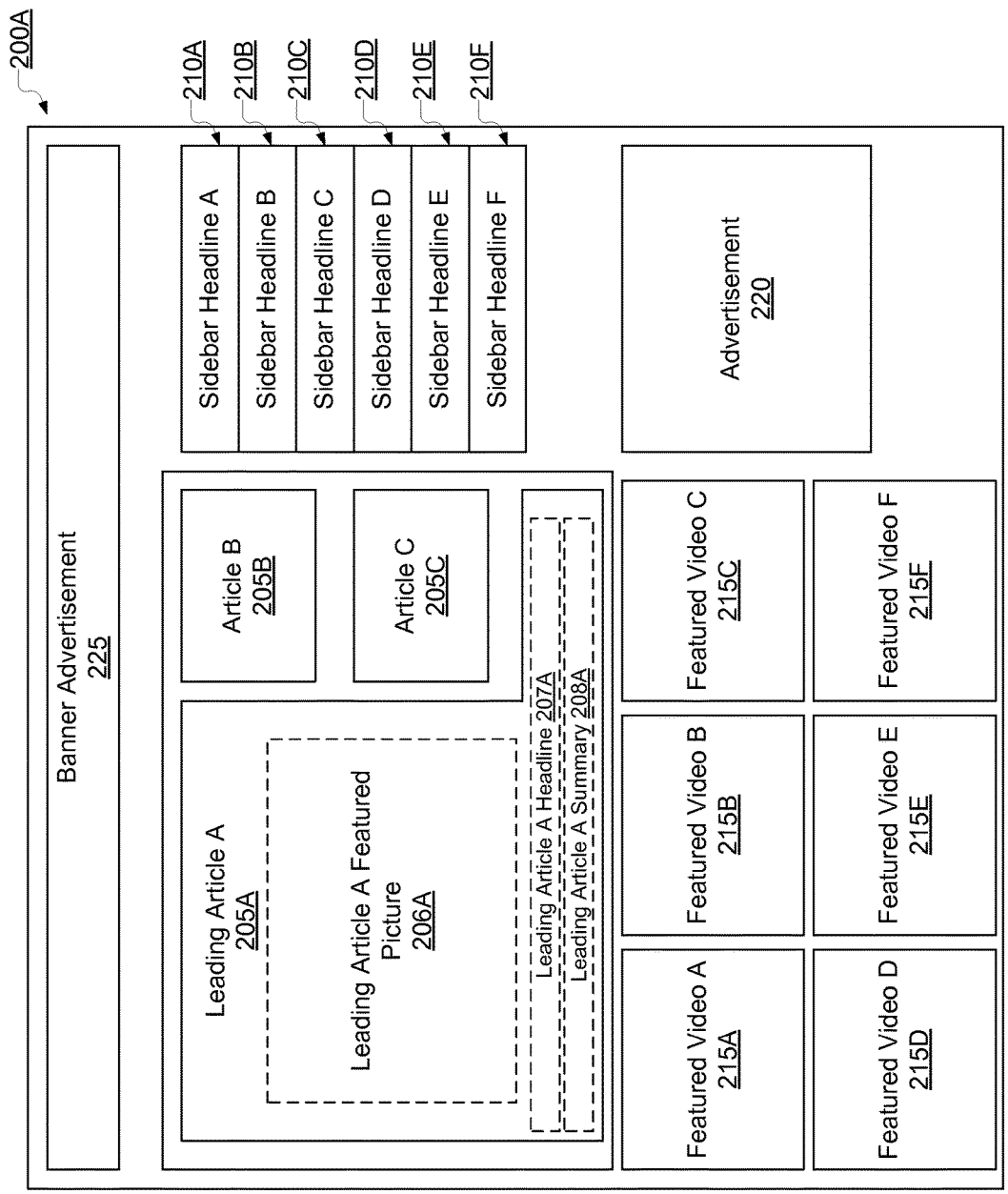
FIG. 2A illustrates an example publication template for use with a computer device type and suitable as a basis for a master publication template, according to one embodiment.

FIG. 2A illustrates an example publication template 200A for use with a computer device type and suitable as a basis for a master publication template, according to one embodiment. The publication template 200A includes example publication elements (or attributes thereof) assigned to different layout sections such as leading articles 205, sidebar headlines 210, featured videos 215, an advertisement 220, and a banner advertisement 225. As illustrated by leading articles A and B (205A, 205B), layout sections associated with different publication elements may have different sizes. Different leading article layout sections may furthermore specify sub-sections for display of different attributes of the corresponding components. For example leading article 205A specifies display of attributes including a headline in sub-section 207A (which may include a hyperlink to the text of the article), a primary picture in sub-section 206A, and an article summary in sub-section 208A. Leading articles 205B, 205C may display the component's headline attribute and primary picture attribute in different respective sub-sections (not shown) of the sections assigned to articles B and C respectively.

The sidebar headlines 210 are publication elements that a publisher (or an automated process) matches to an article component. Here, the publication template may specify that only the headline attribute (in the form of a hyperlink) of the assigned component will be displayed. The featured videos 215 are publication elements that will be matched with video components. Here, the publication template may specify that only the component's title and display image be displayed in different sub-sections associated with each featured video element 215. The featured video layout sections may also include an icon denoting them as videos (e.g., the "play" symbol, a video camera icon).

The advertisement 220 and banner advertisement 225 may include an image, text, and/or animation received from an advertiser that has paid for promotional consideration.

Figure 2B:
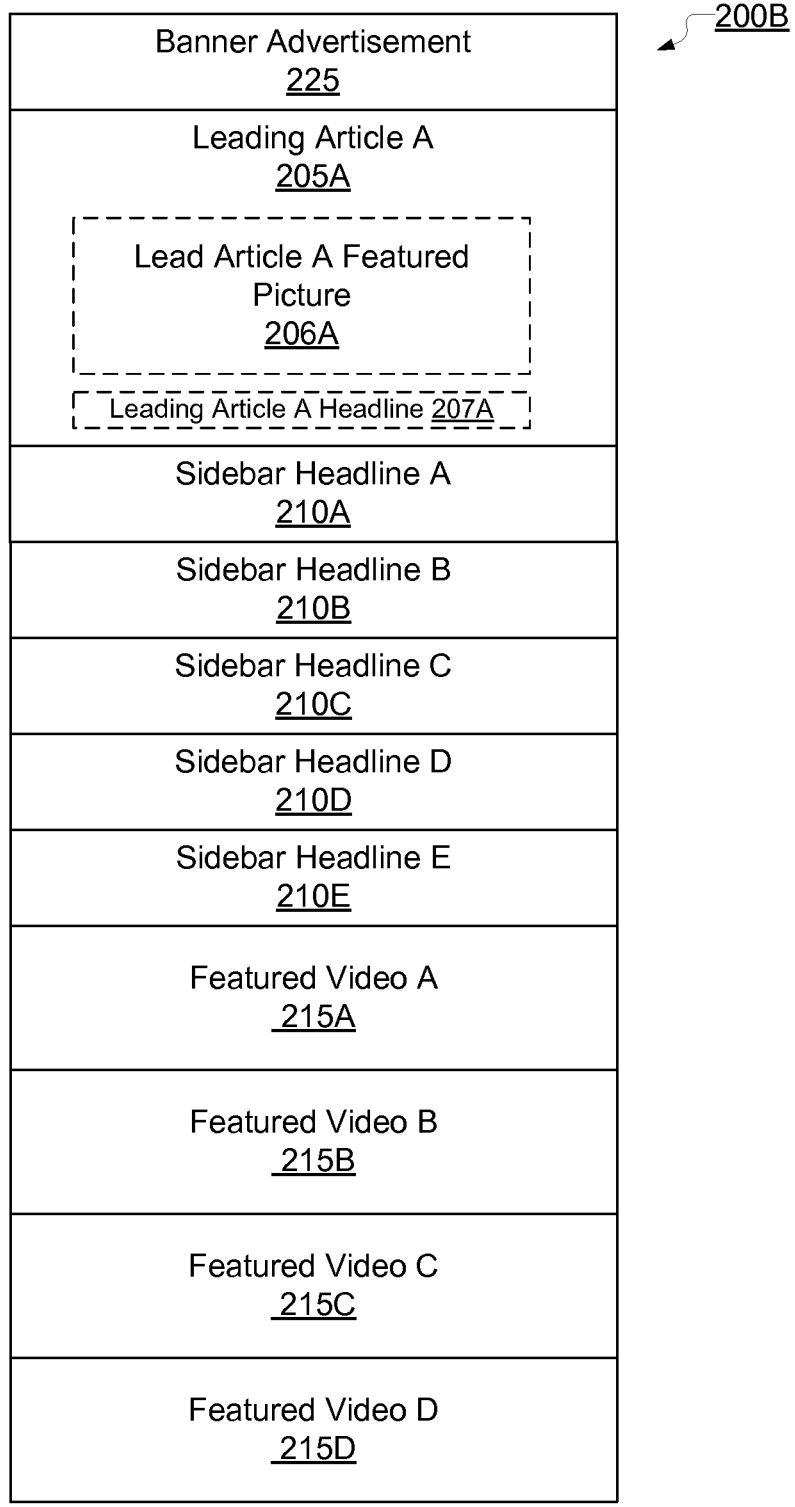
FIG. 2B illustrates an example publication template for use with a mobile device, according to one embodiment.

FIG. 2B illustrates an example publication template 200B for use with a mobile device, according to one embodiment. The example layout 200B includes many of the same publication elements as in the publication template of FIG. 2A including a leading article 205A, sidebar headlines 210, featured videos 215, and a banner advertisement 225. However, the publication elements are arranged differently in the layout and furthermore, different attributes of the publication elements may be displayed. For example, the section of the layout assigned to the leading article 205A only includes sub-sections for display of the article component's headline 207A and primary image 206A attributes, but does not include the summary attribute displayed in FIG. 2A. Furthermore, in the mobile device publication template of FIG. 2B, the leading articles B and C are not displayed, although in one embodiment, the user may access additional leading articles B and C (not shown) using a swiping gesture on leading article 205A. Also, in the example publication template 200B, the sidebar headlines 210 in the mobile publication template specify display of the article component's headline attribute. The featured videos 215 specify display of the video component's title.

The computer view and mobile view (and any other views) can be automatically derived once each publication element is mapped to specific component. If the computer publication template is used as a master publication template, then once each publication element in the computer publication template 200A is assigned to a specific component, the view generator 123 maps these same components to the mobile publication template 200B. For example, when an article is assigned to the leading article A 205A publication element using publication template 200A, the appropriate attributes are automatically placed according to the computer publication template 200A to generate the computer view for publication. Furthermore, the appropriate attributes are automatically placed according to the mobile publication template 200B to generate the mobile view. Components associated with layout sections of publication template 200A that do not have corresponding layout sections on publication template 200B (e.g., sidebar headline 210F, featured videos 215E, 215F, and advertisement 220) are not included in the derived view based on publication template 200B. Furthermore, the user interface 125 displays the components of layout publication templates 200A and 200B differently because their respective sections identify different attributes for display. For example, the featured videos 215 of 200A display a title and a preview image while the featured videos 215 of 200B display only a title.

Generating a View in a Digital Publication

Figure 3:
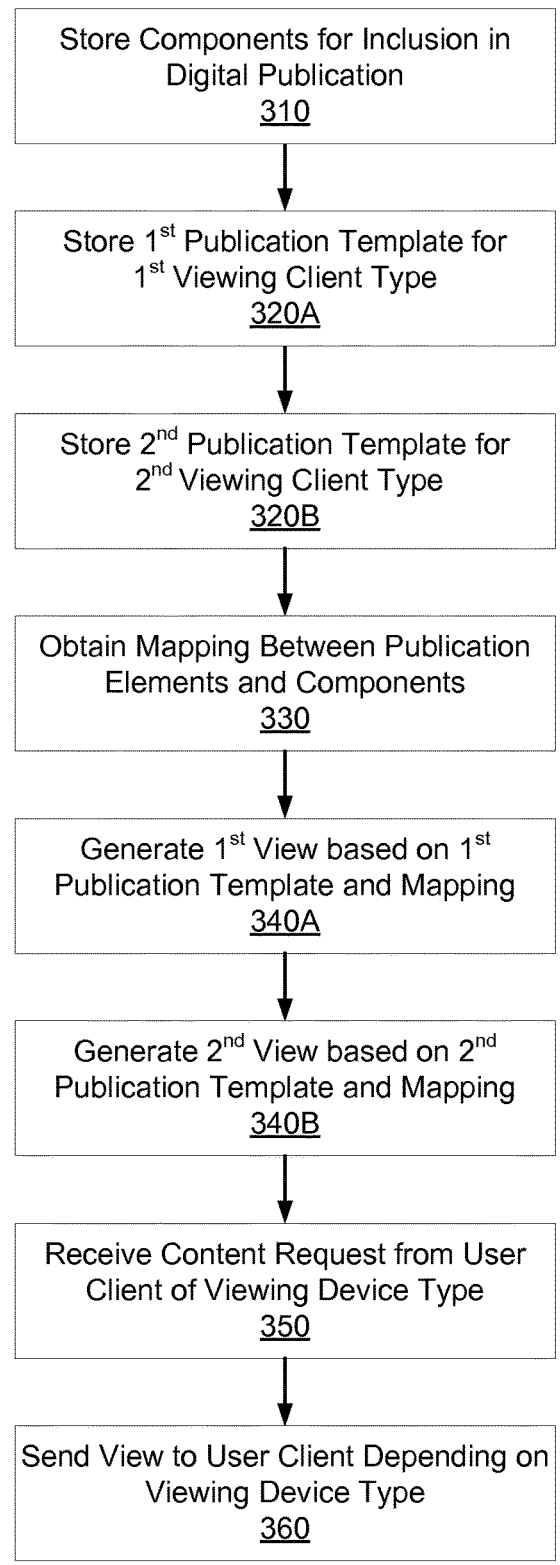
FIG. 3 illustrates a flow diagram of an example process for generating a view of a digital publication, according to one embodiment.

FIG. 3 illustrates a flow diagram for generating a view of a digital publication, according to one embodiment. The CMS 105 receives (e.g., from an enterprise client 155) and stores 310 components in the component store 128 for inclusion in a digital publication. The CMS 105 stores 320A a first publication template associated with a first type of viewing client. The first publication template specifies a first layout for arranging elements of the digital publication when viewed on the first type of viewing client. The publication template also specifies an association between sections of the first layout and publication elements. Similarly, the CMS 105 stores 320B a second publication template associated with a second type of viewing client. The stored publication templates may be received through a publisher interface 122, for example, and stored in the template store 127. The template store 127 may include further templates associated with further types of viewing clients.

The CMS 105 obtains 330 a mapping between publication elements and components. In one embodiment, a graphical representation of a master publication template is presented through the publisher interface 122 at an enterprise client 155. The master publication template has master layout sections associated with publication elements. In one embodiment, the CMS 105 receives a selection of components to associate with each of the master layout sections from the enterprise client 155. The view generator 123 infers a mapping between the components and the publication elements based on the selection of the components to associate with the master layout sections and based on the publication elements associated with the master layout sections. Alternatively or additionally, a module generates the mapping automatically based on one or more rules. Example rules for generating a mapping between components and publication elements include rules based on time priority or popularity associated with components.

Using the obtained mapping, the view generator 123 generates 340A a first view of the digital publication. The first view indicates an arrangement of the components of the mapping in sections of the first layout as specified by the first publication template. Similarly, the view generator 123 generates 340B a second view of the digital publication based on the mapping and the second publication template. Components may have attributes such as digital content or metadata. When a component has one or more attributes, the view generator 123 associates the attributes with sub-sections of the section to which the component is mapped. The arrangement of attributes onto sub-sections may be specified by the publication template, for example.

Through the user interface 125, the CMS 105 receives 350 a content request from a user client 115. The user interface 125 may determine a type of viewing device associated with the user client 115 based on hardware or software characteristics. In general, the first and second types of viewing devices have different hardware and software characteristics associated with display of the digital publication. Example types of viewing devices include a personal computer, a laptop, a smart phone, or a tablet, and the first type of viewing device is typically different from the second type of viewing device. The user interface 125 may further determine a language and/or locale associated with the user client 115. Based on the determined language and/or locale, the user interface 125 may retrieve views corresponding to a publication edition associated with the determined language and/or locale. Through the user interface 125, the CMS 105 sends 360 a view to the user depending on the viewing device type.

Additional Considerations

The disclosed embodiments beneficially allow for efficient creation of a digital publication that is customized for different display and input characteristics of a client. The CMS 105 maintains layouts designed for different client device capabilities. A publisher interface enables publishers to create a mapping between components and publication elements in a publication template. The CMS 105 generates views for a plurality of different device types based on the mapping. The automated generation of views using the mapping reduces redundant work relative to systems in which the publisher manually creates each view. The presence of analytics provides a publisher-friendly method of viewing aggregations of interaction data and facilitates initiation of alternative component testing.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by the one or more processors, e.g., processor 130, that are temporarily configured (e.g., by software or program code comprised of instructions) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a view of digital content through the disclosed principles herein. Thus, while particular embodiments and applications have been illustrated and described, it is to be understood that the disclosed embodiments are not limited to the precise construction and components disclosed herein. Various apparent modifications, changes, and variations may be made in the arrangement, operation and details of the method and apparatus disclosed herein without departing from the spirit and scope defined in the appended claims.

What is claimed is:

1. A method executed by one or more computing devices for generating a view of digital content in a digital publication, the method comprising:

storing, by at least one of the one or more computing devices, a first publication template associated with a first type of client device, the first publication template being configured to map a first set of publication elements to sections of a first layout and the first publication template specifying a user interface for traversing between two or more content components mapped to a single publication element in the first set of publication elements;

storing, by at least one of the one or more computing devices, a second publication template associated with a second type client-device different than the first type of client device, the second publication template-being configured to map a second set of publication elements to sections of a second layout, wherein the second set of publication elements includes at least one publication element which is not in the first set of publication elements and at least one publication element which is in the first set of publication elements;

obtaining, by at least one of the one or more computing devices, a mapping between a plurality of content components corresponding to a digital publication and all publication elements in the first set of publication elements and the second set of publication elements, wherein two or more content components in the plurality of content components are mapped to the single publication element in the first set of publication elements;

generating, by at least one of the one or more computing devices, a first view of the digital publication based on the first publication template and the mapping, the first view including a first set of content components in the plurality of content components mapped to the first set of publication elements and arranged in the first layout; and generating, by at least one of the one or more computing devices, a second view of the digital publication based on the second publication template and the mapping, the second view including a second set of content components in the plurality of content components mapped to the second set of publication elements and arranged in the second layout.

2. The method of claim 1, further comprising:
receiving, by at least one of the one or more computing devices, a content request from a client device;
determining, by at least one of the one or more computing devices, whether the user client corresponds to the first type of client device or the second type of client device; and
transmitting, by at least one of the one or more computing devices, the first view based on a determination that the user client corresponds to the first type of client device or the second view based on a determination that the user client corresponds to the second type of client device.

3. The method of claim 1, wherein the single publication element is assigned to a single section of the first layout.

4. The method of claim 3, wherein the first publication template is configured to display only one of the two or more content components in the single section of the first layout.

5. The method of claim 4, wherein the first publication template is configured to alternate which content component is displayed in the single section of the first layout in response to receiving the user interaction in the single section of the first layout.

6. The method of claim 1, wherein the first type of client device is a mobile device and the user interaction is a swipe.

7. The method of claim 1, wherein the second type of client device is a desktop device.

8. The method of claim 1, further comprising:
collecting, by at least one of the one or more computing devices, user interactions associated with the plurality of content components;
ranking, by at least one of the one or more computing devices, the plurality of content components based at least in part on the collected user interactions; and
mapping, by at least one of the one or more computing devices, at least one content component in the plurality of content components to a different publication element in the first set of publication elements or the second set of publication elements based at least in part on the ranking.

9. An apparatus for generating a view of digital content in a digital publication, the apparatus comprising:
one or more processors; and
one or more memories operatively coupled to at least one of the one or more processors and having instructions stored thereon that, when executed by at least one of the one or more processors, cause at least one of the one or more processors to:

store a first publication template associated with a first type of client device, the first publication template being configured to map a first set of publication elements to sections of a first layout and the first publication template specifying a user interface for traversing between two or more content components mapped to a single publication element in the first set of publication elements;

store a second publication template associated with a second type client-device different than the first type of client device, the second publication template being configured to map a second set of publication elements to sections of a second layout, wherein the second set of publication elements includes at least one publication element which is not in the first set of publication elements and at least one publication element which is in the first set of publication elements;

obtain a mapping between a plurality of content components corresponding to a digital publication and all publication elements in the first set of publication elements and the second set of publication elements, wherein two or more content components in the plurality of content components are mapped to the single publication element in the first set of publication elements;

generate a first view of the digital publication based on the first publication template and the mapping, the first view including a first set of content components in the plurality of content components mapped to the first set of publication elements and arranged in the first layout; and generate a second view of the digital publication based on the second publication template and the mapping, the second view including a second set of content components in the plurality of content components mapped to the second set of publication elements and arranged in the second layout.

10. The apparatus of claim 9, wherein at least one of the one or more memories has further instructions stored thereon that, when executed by at least one of the one or more processors, cause at least one of the one or more processors to:
receive a content request from a client device;
determine whether the user client corresponds to the first type of client device or the second type of client device; and
transmit the first view based on a determination that the user client corresponds to the first type of client device or the second view based on a determination that the user client corresponds to the second type of client device.

11. The apparatus of claim 9, wherein the single publication element is assigned to a single section of the first layout.

12. The apparatus of claim 11, wherein the first publication template is configured to display only one of the two or more content components in the single section of the first layout.

13. The apparatus of claim 12, wherein the first publication template is configured to alternate which content component is displayed in the single section of the first layout in response to receiving the user interaction in the single section of the first layout.

14. The apparatus of claim 9, wherein the first type of client device is a mobile device and the user interaction is a swipe.

15. The apparatus of claim 9, wherein the second type of client device is a desktop device.

16. The apparatus of claim 9, wherein at least one of the one or more memories has further instructions stored thereon that, when executed by at least one of the one or more processors, cause at least one of the one or more processors to:
collect user interactions associated with the plurality of content components;
rank the plurality of content components based at least in part on the collected user interactions; and
map at least one content component in the plurality of content components to a different publication element in the first set of publication elements or the second set of publication elements based at least in part on the ranking.

17. At least one non-transitory computer-readable medium storing computer-readable instructions that, when executed by one or more computing devices, cause at least one of the one or more computing devices to:
store a first publication template associated with a first type of client device, the first publication template being configured to map a first set of publication elements to sections of a first layout and the first publication template specifying a user interface for traversing between two or more content components mapped to a single publication element in the first set of publication elements;
store a second publication template associated with a second type client-device different than the first type of client device, the second publication template being configured to map a second set of publication elements to sections of a second layout, wherein the second set of publication elements includes at least one publication element which is not in the first set of publication elements and at least one publication element which is in the first set of publication elements;
obtain a mapping between a plurality of content components corresponding to a digital publication and all publication elements in the first set of publication elements and the second set of publication elements, wherein two or more content components in the plurality of content components are mapped to the single publication element in the first set of publication elements;
generate a first view of the digital publication based on the first publication template and the mapping, the first view including a first set of content components in the plurality of content components mapped to the first set of publication elements and arranged in the first layout; and
generate a second view of the digital publication based on the second publication template and the mapping, the second view including a second set of content components in the plurality of content components mapped to the second set of publication elements and arranged in the second layout.

18. The at least one non-transitory computer-readable medium of claim 17, further storing computer-readable instructions that, when executed by at least one of the one or more computing devices, cause at least one of the one or more computing devices to:
receive a content request from a client device;
determine whether the user client corresponds to the first type of client device or the second type of client device; and
transmit the first view based on a determination that the user client corresponds to the first type of client device or the second view based on a determination that the user client corresponds to the second type of client device.

19. The at least one non-transitory computer-readable medium of claim 17, wherein the single publication element is assigned to a single section of the first layout.

20. The at least one non-transitory computer-readable medium of claim 19, wherein the first publication template is configured to display only one of the two or more content components in the single section of the first layout.

21. The at least one non-transitory computer-readable medium of claim 20, wherein the first publication template is configured to alternate which content component is displayed in the single section of the first layout in response to receiving the user interaction in the single section of the first layout.

22. The at least one non-transitory computer-readable medium of claim 17, wherein the first type of client device is a mobile device and the user interaction is a swipe.

23. The at least one non-transitory computer-readable medium of claim 17, wherein the second type of client device is a desktop device.

24. The at least one non-transitory computer-readable medium of claim 17, further storing computer-readable instructions that, when executed by at least one of the one or more computing devices, cause at least one of the one or more computing devices to:
collect user interactions associated with the plurality of content components;
rank the plurality of content components based at least in part on the collected user interactions; and
map at least one content component in the plurality of content components to a different publication element in the first set of publication elements or the second set of publication elements based at least in part on the ranking.

\* \* \* \* \*